Figure 1:
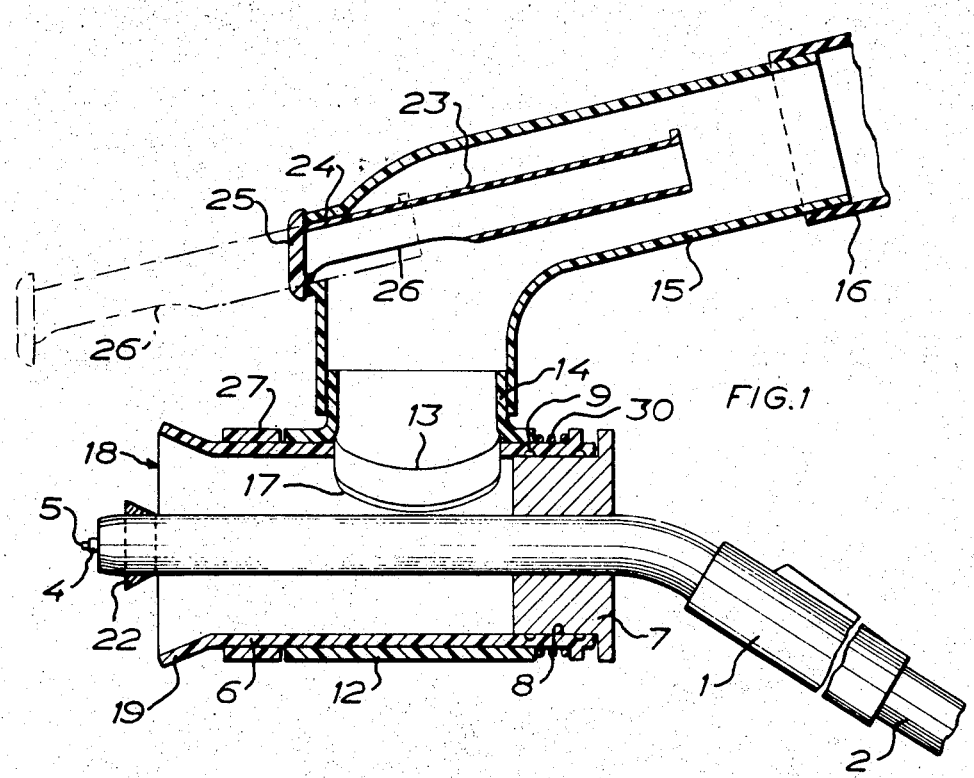

United States Patent [19]
Lindkvist

[11] 3,775,587
[45] Nov. 27, 1973

[54] DEVICES FOR EVACUATION OF IMPURITIES FORMING IN WELDING PROCESSES

[76] Inventor: Erik Allan Lindkvist, Korpralsvagen 38, 902 53 Umea, Sweden

[22] Filed: Aug. 8, 1972

[21] Appl. No.: 278,761

[30] Foreign Application Priority Data
Aug. 9, 1971   Sweden............................ 10163/71

[52] U.S. Cl.................... 219/130, 219/70, 219/136
[51] Int. Cl............................................. B23k 9/32
[58] Field of Search..................... 219/130, 136, 74, 219/75, 70

[56] References Cited
UNITED STATES PATENTS
3,654,421  4/1972  Streetman............................ 219/70
3,524,038  8/1970  O'Kelly................................ 219/70
3,514,567  5/1970  Strang................................. 219/75

FOREIGN PATENTS OR APPLICATIONS
1,526,305  5/1968  France............................. 219/136

OTHER PUBLICATIONS
Mishler, Monroe & Martin, "Development of Special Welding Nozzle Configuration," Sept. 1962, Battelle Memorial Institute, pp. 1–28.

Primary Examiner—Bruce A. Reynolds
Attorney—John Lezdey et al.

[57] ABSTRACT

A device for evacuation of impurities forming in welding processes with supply of protective gas comprises a tube rotatably mounted on the welding tool and surrounding said tool clearance, said tube being provided at its front end portion with an intake opening and having a laterally projecting coupling piece which serves as a handle and is connected to a suction hose.

7 Claims, 2 Drawing Figures

PATENTED NOV 27 1973 3,775,587

DEVICES FOR EVACUATION OF IMPURITIES FORMING IN WELDING PROCESSES

This invention relates to a device for evacuation of smoke and other airborne impurities forming at the use of welding apparatuses equipped with means for supplying protective gas and including a central welding wire guide enclosed by a nozzle ejecting the protective gas surrounding the weld.

In welding processes where use is made of a protective gas surrounding the weld it is imperative that there is an unimpeded flow of protective gas towards the weld so that the gas will cover the weld to the necessary extent. Protective gas is often used in carrying out work on surface treated materials and in welding alloyed or other metals emitting obnoxious substances and gases, and it was early realized that the problem of carrying away welding smoke had to be solved. As certain experiments have shown one might under favourable conditions employ a relatively simple evacuating device which is placed adjacent the weld and sucks away smoke and solid particles therefrom. However, it has been found that when use is made of welding equipment having means for supplying protective gas it is of the utmost importance to very exactly dimension the vacuum of and the rate of flow in the evacuating device because the protective gas around the weld will otherwise be disturbed and even carried along. It has been suggested to solve this problem by increasing the supply and/or the pressure of the protective gas but this is not an acceptable solution for economical reasons. In welding work pieces of complicated configuration it is not either possible always to place separate evacuating devices sufficiently close to the weld. Moreover, such an evacuating device constantly has to be moved as work proceeds and if the welding operator wishes to safeguard an uninterrupted evacuation of welding smoke and like obnoxious gases he often has to interrupt his work and adjust the device. Different types of work require different pressures of the protective gas and as it is important for economical reasons that the gas consumption is kept as low as possible, the capacity of the evacuating device must be carefully adjusted for each work. In a separate device of this type this will not be feasible, and to ensure that the protective gas is not impaired in any way, as a rule too large a quantity of protective gas is allowed to escape or so low a vacuum is employed that the resulting evacuation is unsatisfactory.

One object of the present invention is to provide a device which independently of the configuration of the work piece and the pressure of the protective gas supplied always ensures an effective evacuation of the impurities forming in welding operations. According to the invention, the device is a tube rotatably mounted on the welding tool and surrounding said tool with clearance, said tube being provided at its front end portion with an intake opening and having a laterally projecting coupling piece which serves as a handle connected to a suction hose.

Figure 2:
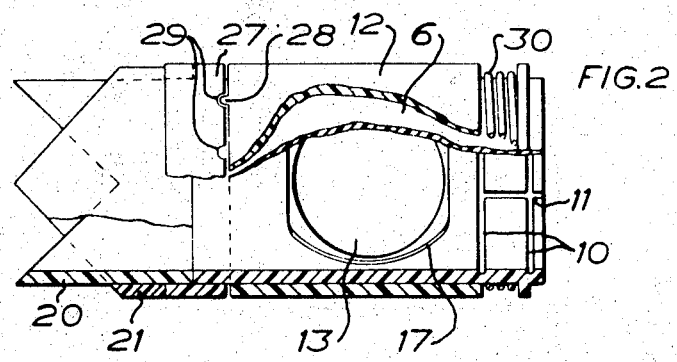

The invention will be more fully described hereinbelow with reference to the accompanying drawing in which:

FIG. 1 in section and side view shows a preferred embodiment of the device;

FIG. 2 partly in section shows a slightly modified embodiment as seen from below.

The welding apparatus illustrated in the drawing comprises a handle 1 to the rear end of which there is fixedly connected a hose 2 having a guide passage for the welding wire and serving as a conduit for supplying the protective gas. The handle 1 merges in the tool 3 proper which comprises a nozzle portion through the centre of which extends a guide 4 for the welding wire 5. The protective gas is thus discharged at the front end of the tool 3, thereby forming a protective gas cushion around the arc at the welding wire.

In the embodiment illustrated in FIG. 1, the device for evacuation of welding smoke and other airborne particles from the weld includes a tube 6 which is rotatably and movably carried by a supporting ring 7 mounted around the tool 3 at the handle 1. To permit rotation of the tube and simultaneously ensure retention thereof in longitudinal direction the surface of engagement 8 of the supporting ring may be formed with prjections 9 which engage in annular grooves 10 in the inner surface of the tube end. A transverse groove 11 permits moving the tube into various positions and also dismounting thereof.

A sleeve 12 is mounted for rotation about the tube 6 and has a connecting socket 14 disposed at a recess 13 and having the curved coupling piece 15 rotatably mounted thereon. The interconnection of the socket and the coupling piece can be realized in the same way as that of the tube and the supporting ring. The coupling piece 15 in turn is adapted for interconnection with the suction hose 16 which is coupled to a suction system in which an approximately constant vacuum prevails.

A recess 17 is formed in the tube 6. It is preferably at least equally large in the peripheral sense as the recess 13 in the sleeve 12, and by rotation of the sleeve 12 through a small or large angle the recess 17 can be caused wholly or partly to overlap the recess 13 in the sleeve. By adjusting the sleeve 12 into different positions with respect to the tube 6 the flow from the tube 6 to the hose can be regulated or throttled.

To prevent that a relative position set between the tube 6 and the sleeve 12 is altered for instance when the coupling piece because of the configuration of the work piece has to be swung from one side of the tool to the other some kind of locking mechanism should be arranged between the tube 6 and the sleeve 12. In the embodiment illustrated a stop ring 27 is secured ahead of the sleeve to the tube 6 and a boss 28 is provided on the sleeve 12. In the edge of the ring 27 facing the sleeve 12 there are formed several notches 29 which correspond to different throttling positions. A resilient means in the form of a spring 30 or a rubber ring is disposed rearwardly of the sleeve 12 so that the sleeve can be shifted rearwardly against the action of said resilient means and so turned that the boss 28 will be placed opposite a desired notch 29. However, said locking mechanism can be given any other desired design, For instance, a ring exerting appropriate friction can be provided between the sleeve and the tube.

A suction nozzle 18 is arranged at the front end of the tube 6. In the embodiment illustrated in FIG. 1 said nozzle is formed by an outwardly flared portion 19 which may be integral with the tube 6. In certain circumstances it may be difficult with the use of a flared nozzle to get sufficiently close to the weld. In that case use can be made of the nozzle illustrated in FIG. 2. The latter nozzle which is adapted to permit being used when welding is effected on planar surfaces and in corners and angles is a two-part nozzle. One part 20 which may be integral with the tube 6 or be substituted for a removably mounted flared nozzle 19 is cut obliquely in the manner of a wedge so that it can be readily moved close to a weld within a corner. To permit using the nozzle also on planar surfaces the nozzle has an outer rotary ring 21 which when welding is effected in corners can be set in parallel with the part 20, but which is otherwise rotated through 90°, thereby laterally screening the apertures formed in the part 20. The nozzle 20 having the ring 21 can of course be given such a configuration that the outer portions thereof extend obliquely outwardly.

When welding smoke and obnoxious gases are evacuated in work where use is made of a low pressure of the protective gas it might happen that the protective gas envelope around the weld is disturbed and the quality of the weld is jeopardized. To obviate this the tool can be provided with a screen ring 22 placed just behind the nozzle aperture thereof, said screen ring having the shape illustrated in FIG. 1 or any other shape warranted by the specific conditions prevailing at the weld. The provision of the screen ring 22 will eliminate the risk of the protective gas envelope around the weld being disturbed or carried away.

When welding operations are made at perpendicular surfaces it may happen, particularly if the evacuation has to be heavily throttled because of a low protective gas pressure, that the thermal lifting force of the welding gases exceeds and counteracts the force exerted by the evacuating device so that at least part of the welding gases rise and are not caught by the nozzle 18 of the tube 6. To prevent this, a specific evacuation tube 23 is arranged in the embodiment according to FIG. 1. As shown, the tube 23 in inoperative position is fully pushed into the coupling piece 15 and projects through an opening 24 having a flange which is adapted to serve as a guide. The tube 23 is open at the rear end and has at the front end a cover-like part 25 which in the retracted position of the tube prevents air from being sucked thereinto. Adjacent the front end, the tube 23 is cut such that an elongated opening 26 is formed. In the position of use indicated by dash lines it is shown how the opening 26 when welding is effected will be situated above the weld so that it is able to catch the welding smoke.

The aforementioned evacuating tube 23 may be incorporated in the complete equipment of the evacuating device, but it may also constitute a special attachment together with the coupling piece which is specifically conformed for this purpose.

It should finally be mentioned that owing to its configuration the evacuating device to a not inconsiderable extent facilitates handling of the welding tool.

In welding tools devoid of evacuating device the operator is often forced to grasp the tool by the insulating handle which is at a relatively large distance from the front end of the tool. Even if he makes use of both hands the work is very tiresome. Considering that the evacuating device is spaced from the tool proper and besides is cooled to some extent by the air sucked therethrough, the tube and the sleeve and/or the coupling piece can be utilized as an additional handle, which gives an improved balance of the tool and less strenuous holding thereof.

What I claim and desire to secure by Letters Patent is:

1. A device for evacuation of smoke and other airborne impurities formed during the use of welding apparatus having means for supplying a protective gas surrounding a central welding wire guide enclosed by a nozzle for ejecting the protective gas around the weld, said device comprising an evacuating tube rotatably mounted on and surrounding the welding tool and spaced therefrom, said tube being provided at its front end portion with an intake opening, a coupling element mounted on and projecting laterally from said tube, a suction hose connected to said coupling element, said coupling element including a sleeve rotatably mounted on said tube, the circumferential wall of said tube and said sleeve being provided with corresponding openings therein whereby the passage formed by said combined openings leading to the suction hose may be regulated by relative rotation of one of said evacuation tube and said sleeve with respect to the other.

2. A device as claimed in claim 1 and further comprising means for locking the sleeve in a predetermined angular position with respect to said tube.

3. A device as claimed in claim 1 and further comprising a conical screen ring mounted on the nozzle for ejecting the protective gas at a position adjacent the intake opening of said evacuating tube.

4. A device as claimed in claim 1 wherein the intake opening of said evacuation tube comprises two concentric, mutually rotatable, tube-like elements each having oblique, wedge-shaped recesses in the outer circumference thereof, whereby, when aligned, said concentric elements permit welding in corners and when offset, prevent excess air from entering said evacuation tube.

5. A device as claimed in claim 1 and further comprising telescopic means mounted on said coupling element for selectively withdrawing airborne impurities laterally of the intake opening of said evacuating tube.

6. A device as claimed in claim 5 wherein said telescopic means is provided with an intake opening adjacent its outer end, said means telescoping longitudinally of the axis of the welding tool.

7. A device as claimed in claim 1, wherein said coupling element is rotatably mounted on said evacuation tube.

* * * * *